United States Patent
Onishi et al.

(10) Patent No.: US 10,446,279 B2
(45) Date of Patent: Oct. 15, 2019

(54) BOILING WATER TYPE NUCLEAR POWER PLANT

(71) Applicant: Hitachi-GE Nuclear Energy, Ltd., Hitachi-shi, Ibaraki (JP)

(72) Inventors: Yuriko Onishi, Hitachi (JP); Kazuhiro Yoshikawa, Hitachi (JP); Takashi Sumikawa, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 1042 days.

(21) Appl. No.: 14/831,232

(22) Filed: Aug. 20, 2015

(65) Prior Publication Data

US 2016/0055924 A1 Feb. 25, 2016

(30) Foreign Application Priority Data

Aug. 25, 2014 (JP) .................................. 2014-170490

(51) Int. Cl.
*G21C 9/00* (2006.01)
*G21C 15/18* (2006.01)
(Continued)

(52) U.S. Cl.
CPC ............. *G21C 15/182* (2013.01); *G21D 1/02* (2013.01); *G21D 3/04* (2013.01); *G21C 1/084* (2013.01); *Y02E 30/40* (2013.01)

(58) Field of Classification Search
CPC .. G21D 1/00; G21D 1/02; G21D 1/04; G21D 3/04; G21D 3/06
See application file for complete search history.

(56) References Cited

U.S. PATENT DOCUMENTS

2013/0170599 A1 7/2013 Muller et al.
2014/0093025 A1 4/2014 Mekiska

FOREIGN PATENT DOCUMENTS

| EP | 2 728 584 A2 | 5/2014 |
| JP | 56-33600 | 4/1981 |

(Continued)

OTHER PUBLICATIONS

Japanese-language Office Action issued in counterpart Japanese Application No. 2014-170490 dated Aug. 8, 2017 with English translation (Nine (9) pages).

(Continued)

*Primary Examiner* — Marshall P O'Connor
(74) *Attorney, Agent, or Firm* — Crowell & Moring LLP

(57) ABSTRACT

To more reliably supply cooling water to a reactor pressure vessel and a reactor containment vessel using a back-up building if a severe accident should occur, a boiling water type nuclear power plant includes a nuclear reactor building including a reactor containment vessel, and an external building, which is installed independently outside the nuclear reactor building and which has an anti-hazard property. The external building has a power source and an operating panel independent of the nuclear reactor building. The boiling water type nuclear power plant includes a water injection pump installed inside the external building, an alternative water injection pipe performing water injection at least on a reactor pressure vessel or the reactor containment vessel in the nuclear reactor building from the water injection pump, and a valve connected to the alternative water injection pipe, making it possible to perform alternative water injection if a severe accident occurs.

16 Claims, 5 Drawing Sheets

(51) Int. Cl.
*G21D 1/02* (2006.01)
*G21D 3/04* (2006.01)
*G21C 1/08* (2006.01)

(56) References Cited

FOREIGN PATENT DOCUMENTS

| | | |
|---|---|---|
| JP | 3-274493 A | 12/1991 |
| JP | 5-264774 A | 10/1993 |
| JP | 2014-29300 A | 2/2014 |
| JP | 2014-29303 A | 2/2014 |
| JP | 2014-89134 A | 5/2014 |

OTHER PUBLICATIONS

United Kingdom Search and Examination Report issued in counterpart United Kingdom Application No. GB1514665.7 dated Jul. 20, 2016 (6 pages).

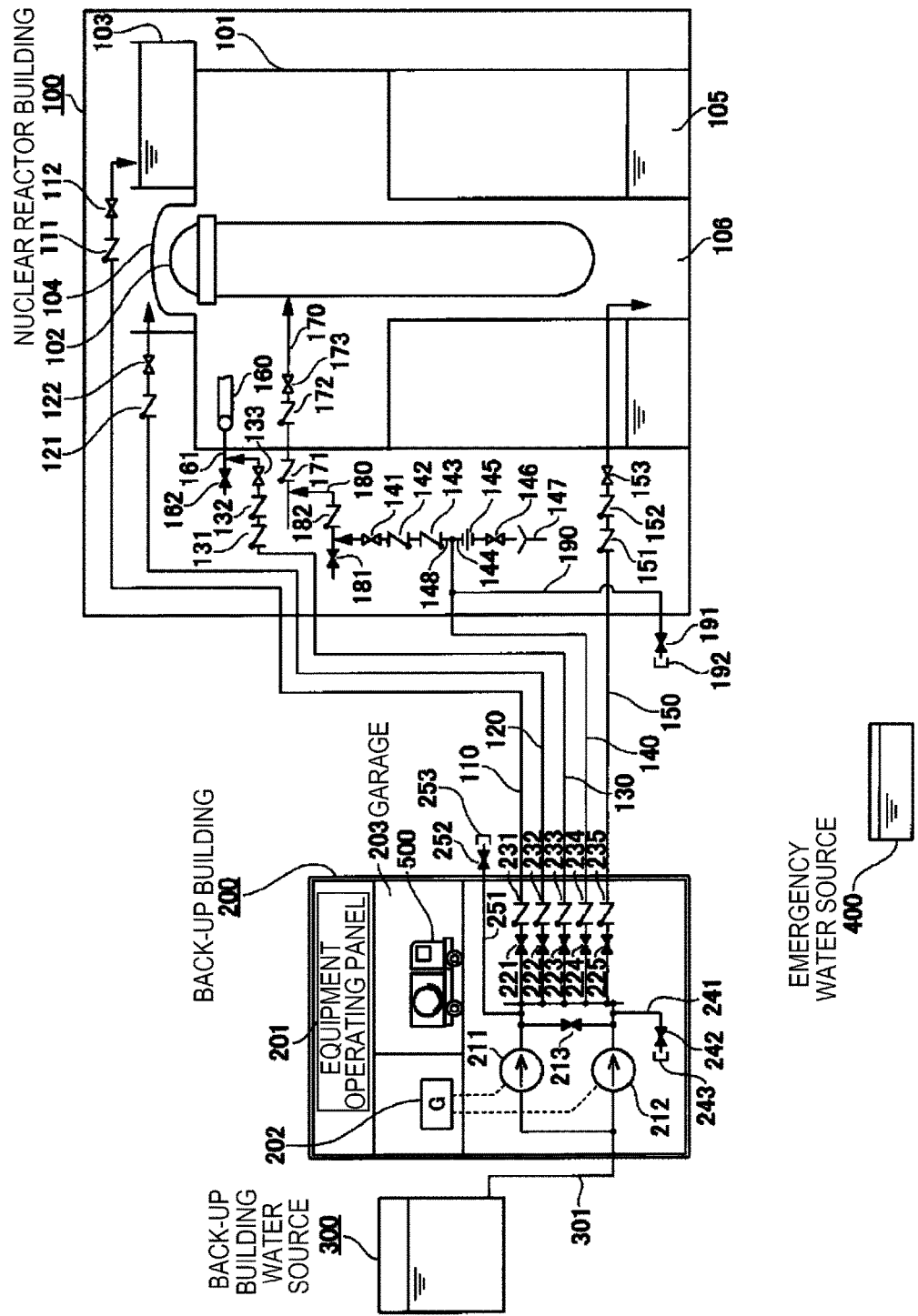
[FIG. 1]

[FIG. 2]
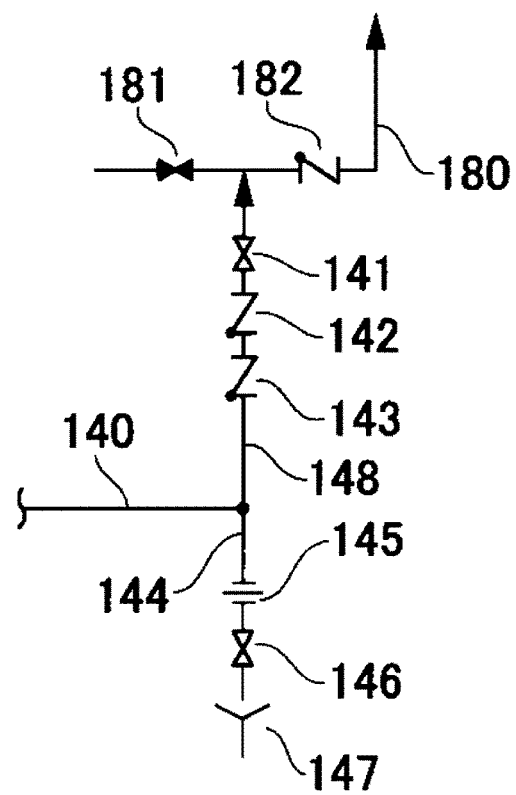

[FIG. 3]
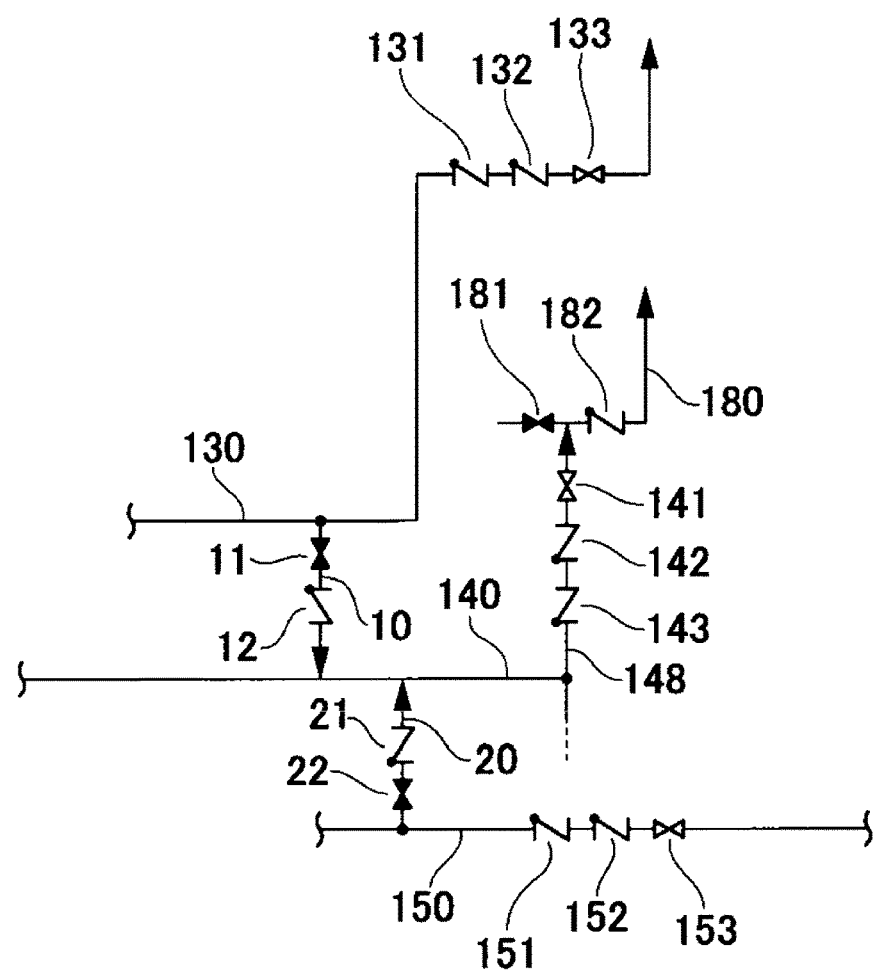

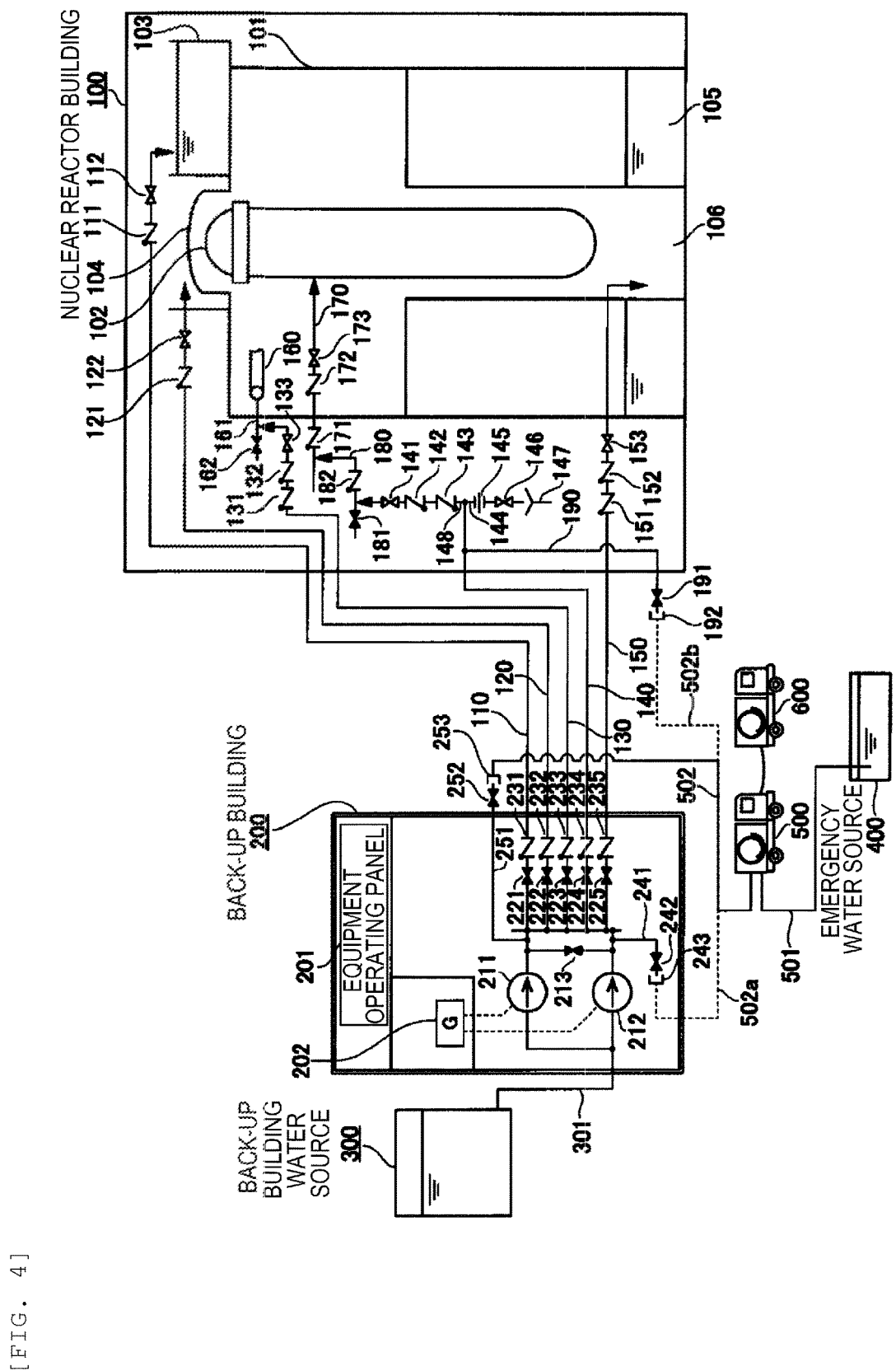
[FIG. 4]

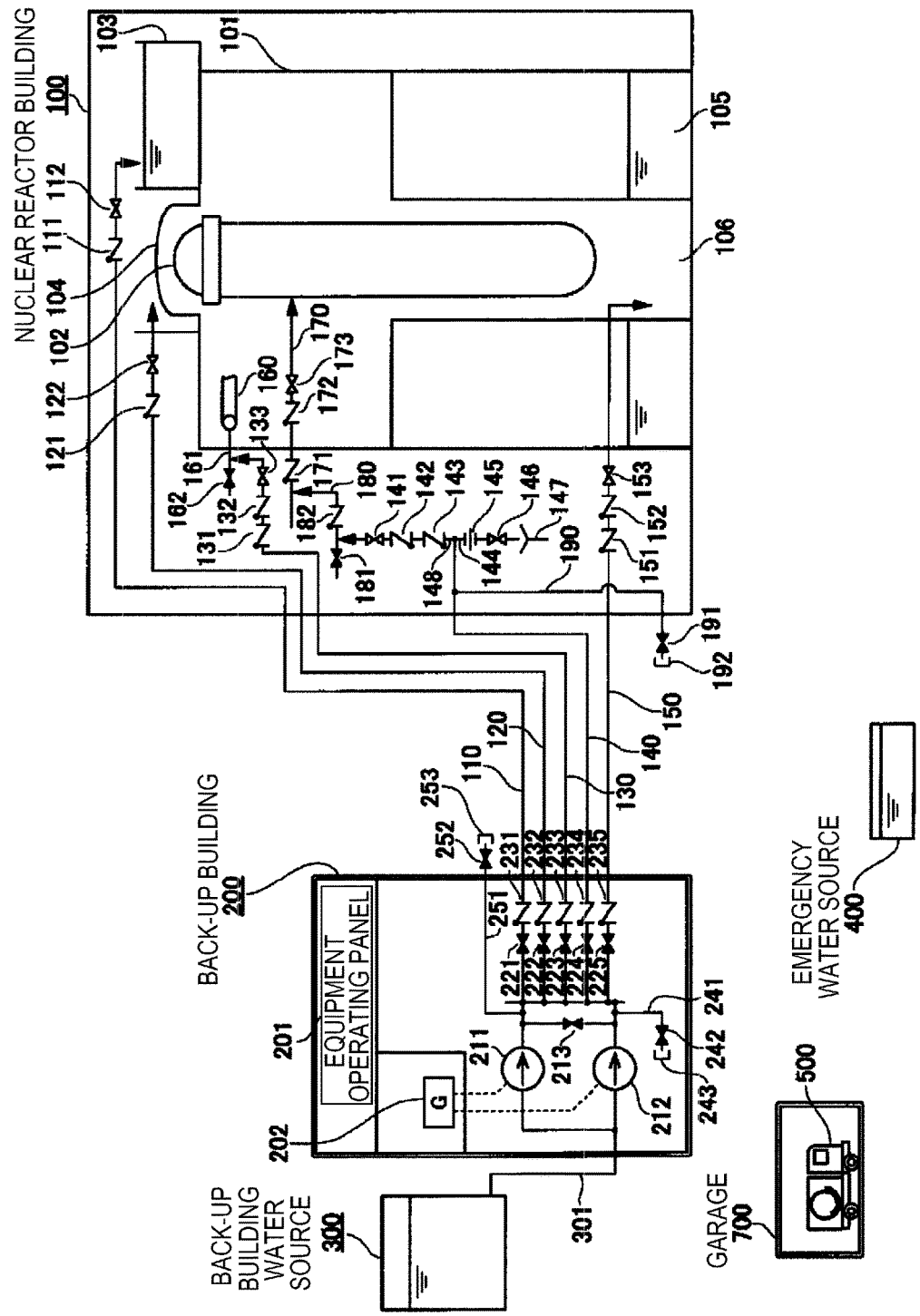
[FIG. 5]

BOILING WATER TYPE NUCLEAR POWER PLANT

TECHNICAL FIELD

The present invention relates to a boiling water type nuclear power plant and, in particular, to a technique for cooling a nuclear reactor at the time of a severe accident and securing the soundness of a nuclear reactor containment vessel.

BACKGROUND ART

In a boiling water type nuclear power plant, various measures are taken to prevent an excessive increase in fuel canning pipe temperature at the time of a loss-of-coolant accident due to breakage of piping or the like connecting to a reactor pressure vessel. For example, at the time of emergency, a cooling material is injected into the core by an emergency core cooling system (hereinafter referred to as the "ECCS"), whereby the core is submerged. Through this operation of the ECCS, fuel failure is prevented, and core decay heat is removed. In conformity with the concept of safety equipment design, the ECCS is designed so as to be capable of securing the requisite safety even if there is single failure of the active component of each section or external power loss.

In the case of a total power loss accident, the system is designed such that, within a specific period, the core cooling is maintained by a reactor core isolation cooling system using a portion of the nuclear reactor vapor for turbine drive.

On the other hand, in the boiling water type nuclear plant, a countermeasure (hereinafter referred to as the "accident management") is prepared for the purpose of further enhancing safety even when there occurs, through at a very low probability of occurrence, a severe accident substantially exceeding in scale the accident level to be imagined at the stage of design. For example, as accident management equipment utilizing existing systems, there is provided an alternate water injection system configured to supply cooling water to the reactor pressure vessel or the reactor containment vessel from a condensate storage tank by using a general service water supply pump, or from a fire-fighting water tank by using a fire pump.

PTL 1 discloses a technique according to which a back-up building surrounded by a hazard wall is provided at a place at a fixed distance from the nuclear reactor building, and this back-up building is equipped with an independent power source and an operating panel, thereby securing further safety.

CITATION LIST

Patent Literature

PTL 1: JP-A-2014-89134

SUMMARY OF INVENTION

Technical Problem

The installation of a water injection pump in the above-mentioned back-up building is planned; however, to actually supply cooling water from the back-up building to the reactor pressure vessel and the reactor containment vessel in the nuclear reactor building, it is necessary to perform valve operation such as the switching of the water supply route. Further, if there is some abnormality in the water supply piping from the back-up building to the nuclear reactor building, it is impossible to supply cooling water from the pump in the back-up building to the reactor pressure vessel and the reactor containment vessel.

It is an object of the invention to make it possible to more reliably supply cooling water to the reactor pressure vessel and the reactor containment vessel by using the back-up building.

Solution to Problem

A boiling water type nuclear power plant of the invention includes a nuclear reactor building including a reactor containment vessel, and an external building installed independently outside the nuclear reactor building and exhibiting an anti-hazard property. The external building includes a power source and an operating panel independent of the nuclear reactor building.

The boiling water type nuclear power plant of the invention includes a pump installed inside the external building, alternative water injection pipes configured to perform water injection from the pump at least on the reactor pressure vessel or the reactor containment vessel in the nuclear reactor building, and valves connected to the alternative water injection pipes.

Advantageous Effects of Invention

In accordance with the invention, it is possible to perform water injection on the reactor containment vessel, etc. from the pump installed inside the external building exhibiting an anti-hazard property by using the alternative water injection pipes. Thus, according to the invention, if a severe accident which may occur with a very low probability but substantially exceeds in scale the accident level to be imagined at the stage of design occurs, the water injection route for the cooling water can be secured, making it possible to further enhance the safety of the boiling water type nuclear power plant.

BRIEF DESCRIPTION OF DRAWINGS

FIG. 1 is a schematic diagram illustrating an example of a boiling water type nuclear power plant according to a first embodiment of the invention.

FIG. 2 is a schematic diagram illustrating a connection example of an alternative water injection pipe according to the first embodiment of the invention.

FIG. 3 is a schematic diagram illustrating a modification example of the alternative water injection pipe according to the first embodiment of the invention.

FIG. 4 is an explanatory view illustrating an example of a water injection condition using a pump wheel according to the first embodiment of the invention.

FIG. 5 is a schematic diagram illustrating an example of a boiling water type nuclear power plant according to a second embodiment of the invention.

DESCRIPTION OF EMBODIMENT

<1. First Embodiment>

In the following, the first embodiment of the invention will be described with reference to FIGS. 1 through 4.

[1-1. Construction of the Boiling Water Type Nuclear Power Plant]

FIG. 1 is a diagram illustrating the overall construction of a boiling water type nuclear power plant of the first embodiment of the invention.

The boiling water type nuclear power plant is equipped with a nuclear reactor building 100. Inside the nuclear reactor building 100, there are arranged a reactor containment vessel 101, a reactor pressure vessel 102, a spent fuel pool 103, a reactor well 104, a pressure suppression pool 105, and a dry well 106.

A spray pipe 160 is arranged in the reactor containment vessel 101, and sprinkling is effected in the reactor containment vessel 101 via a pipe 161 in the nuclear reactor building 100. A valve 162 is connected to the pipe 161.

A water injection pipe 170 is arranged in the reactor pressure vessel 102, and water injection is performed in the reactor pressure vessel 102 by using the water injection pipe 170. Connected to the water injection pipe 170 are check valves 171 and 172 and a gate valve 173.

FIG. 1 shows, as the piping in the nuclear reactor building 100, only the piping necessary in illustrating the present embodiment. Although not shown in particular in FIG. 1, the nuclear reactor building 100 is provided with equipment allowing sufficient water injection in the nuclear reactor building 100 even if various accidents to be imagined at the design stage occur.

And, the boiling water type nuclear power plant of the present embodiment is equipped with a back-up building 200 as an external building at a place spaced away from the nuclear reactor building 100. The back-up building 200 is of a structure exhibiting an anti-hazard property, and has an equipment operating panel 201 and a power source equipment 202 independent of the nuclear reactor building. Here, the structure having an anti-hazard property is a structure surrounded by a hazard wall (not shown), and is a structure capable of securing the interior soundness, withstanding earthquake, flood, snow, etc. This back-up building 200 is provided at a place spaced away by some distance (e.g., several hundred m) from the nuclear reactor building 100.

At the time of emergency, the equipment operating panel 201 operates the equipment of the nuclear reactor building 100 in addition to the equipment of the back-up building 200. The power source equipment 202 is provided with a generator generating electricity necessary for operating the apparatus accommodated in the nuclear reactor building 100 and the back-up building 200, and a battery supplying operating power to the generator.

Further, the back-up building 200 is equipped with a garage 203 capable of accommodating a movable pumper vehicle 500. Apart from the movable pumper vehicle 500, this garage 203 may accommodate a movable power source car 600 (FIG. 4) in which an emergency power source equipment is mounted.

In the vicinity of the back-up building 200, there is installed a back-up building water supply source 300. And, a pipe 301 is arranged to extend from the back-up building water supply source 300 to the back-up building 200; water obtained from the pipe 301 is supplied to five alternative water injection pipes 110, 120, 130, 140, and 150 via water injection pumps 211 and 212. The two water injection pumps 211 and 212 are operated by the power obtained from the power source equipment 202 in the back-up building 200. The output side pipes of the two water injection pumps 211 and 212 are connected via a valve 213. Thus, even if one of the water injection pumps 211 and 212 is out of order, the back-up building 200 can perform alternative water injection by all the alternative water injection pipes 110 through 150.

In the alternative water injection pipes 110 through 150 in the back-up building 200, there are respectively arranged valves 221, 222, 223, 224, and 225, and check valves 231, 232, 233, 234, and 235. The alternative water injection pipes 110 through 150 drawn out of the back-up building 200 are arranged to extend into the interior of the nuclear reactor building 100.

The water injection through the alternative water injection pipe 110 is performed on the spent fuel pool 103 in the nuclear reactor building 100. A check valve 111 and a gate valve 112 are arranged in the alternative water injection pipe 110 in the nuclear reactor building 100.

The water injection through the alternative water injection pipe 120 is performed on the reactor well 104 in the nuclear reactor building 100. A check valve 121 and a gate valve 122 are arranged in the alternative water injection pipe 120 in the nuclear reactor building 100.

The water injection through the alternative water injection pipe 130 is performed on the reactor containment vessel 101 in the nuclear reactor building 100. The alternative water injection pipe 130 is connected to the water injection pipe 161 performing water injection on the reactor containment vessel 101. Check valves 131 and 132 and a gate valve 133 are arranged in the alternative water injection pipe 130 in the nuclear reactor building 100.

The water injection through the alternative water injection pipe 140 is performed on the reactor pressure vessel 102 in the nuclear reactor building 100. The water injection through the alternative water injection pipe 140 may be performed on the reactor containment vessel 101 in the nuclear reactor building 100.

The alternative water injection pipe 140 is connected to a water injection pipe 180 in the nuclear reactor building 100 via an up-grade water injection pipe 148. The water injection pipe 180 is connected to still another water injection pipe 170 to perform water injection in the reactor pressure vessel 102. Arranged in the water injection pipe 170 are the check valves 171 and 172 and the gate valve 173. Arranged in the water injection pipe 180 are a gate valve 181 and a check valve 182. The up-grade alternative water injection pipe 148 is connected between the gate valve 181 and the check valve 182. A gate valve 141 and check valves 142 and 143 are arranged in the alternative water injection pipe 148 in the nuclear reactor building 100. The connection of the alternative water injection pipe 140 to the water injection pipe 180 will be described in detail below (FIG. 2).

The water injection through the alternative water injection pipe 150 is performed on the lower dry well 106 in the nuclear reactor building 100. Check valves 151 and 152 and a gate valve 153 are arranged in the alternative water injection pipe 150 in the nuclear reactor building 100.

The gate valves 112, 122, 133, 141, and 153 of the alternative water injection pipes 110 to 150 arranged in the nuclear reactor building 100 are all valves kept open during operation of the nuclear power plant; they are valves that are closed only during maintenance. The check valves 111, 121, 131, 132, 142, 143, 151, and 152 are all valves allowing water injection from the back-up building 200 side to the nuclear reactor building 100 side and preventing backward flow.

Further, an emergency water source 400 is arranged on the ground in the power plant between the nuclear reactor building 100 and the back-up building 200. This emergency water source 400 is a water source independent of the water source 300 for the back-up building. An example in which the emergency water source 400 is used will be described below.

[1-2. Construction of the Connection Portions of the Alternative Water Injection Pipes]

FIG. 2 is a diagram illustrating in detail the portion where the alternative water injection pipe 140 is connected to the water injection pipe 180.

The alternative water injection pipe 140 is connected to the water injection pipe 180 via the up-grade water injection pipe 148. That is, as shown in FIG. 2, the alternative water injection pipe 140 starting from the back-up building 200 is connected to the water injection pipe 148 inside the nuclear reactor building 100, and is connected to the water injection pipe 180 via the water injection pipe 148 designed as an up-grade pipe. In this case, the gate valve 141 and the check valves 142 and 143 are arranged at midpoints in the up-grade water injection pipe 148.

At the portion where the up-grade water injection pipe 148 is connected to the water injection pipe 140, which is the lowest, there are arranged a drain pipe 144 and a flow rate restrictor 145, and on the lower side of the flow rate restrictor 145, there is arranged a drain 147 via a gate valve 146. As shown in FIG. 1, the flow rate restrictor 145 and the drain 147 are installed inside the nuclear reactor building 100.

Due to the provision of the flow rate restrictor 145 and the drain 147, it is possible to prevent reactor water and reactor vapor from leaking through the check valves 142, 143, and 182 having the containment vessel partition function, and it is possible to prevent the reactor water and the reactor vapor from being discharged to the exterior of the nuclear reactor building 100 and into the back-up building 200 through the alternative water injection pipes 140. Thus, it is possible to prevent diffusion of the radioactive substance contained in the reactor water and the reactor vapor to the exterior of the nuclear reactor building 100.

The water discharge mechanism such as the drain 147 may detect leakage of the reactor water and the reactor vapor containing radioactive substance by measuring the generation amount of the discharge water. The leakage of the reactor water and the reactor vapor is detected, for example, by the equipment operating panel 201 in the back-up building 200.

[1-3. Condition of the Water Injection from the Back-Up Building]

In the boiling water type nuclear power plant of the example shown in FIG. 1, at the time of emergency where it is impossible to perform water injection through the water injection pipe 170 normally used in the nuclear reactor building 100, it is possible to perform water injection by using the alternative water injection pipes 110 through 150 extending from the back-up building 200. For example, when there occurs a severe accident such as earthquake, flood, and snow, and it is impossible to perform water injection by using the normal piping, it is possible to perform water injection through the alternative water injection pipes 110 through 150 by starting the pumps 211 and 212 in the back-up building 200. The pumps 211 and 212 in the back-up building 200 are supplied with power from the power source equipment 202 in the back-up building 200, so that, even when there is some abnormality in the nuclear reactor building 100 side power source equipment, it is possible to perform water injection reliably.

In this case, the valves with which the alternative water injection pipes 110 through 150 in the nuclear reactor building 100 are equipped are all check valves and gate valves that are normally kept open. Thus, when performing water injection from the back-up building 200 by using the alternative water injection pipes 110 through 150, there is no need at all to perform valve opening/closing operation inside the nuclear reactor building 100; water injection can be performed solely through the operation on the back-up building 200 side. Thus, at the time of occurrence of a severe accident, it is possible to perform alternative water injection solely through operation by the operator inside the back-up building 200, making it possible to quickly start the alternative water injection and to perform continuous water injection for a long period of time. Further, since there is no need to perform operation inside the nuclear reactor building 100, there is no need for the operator to approach the nuclear reactor building 100 when starting the alternative water injection, which helps to secure safety for the operator.

[1-4. Example in which Bypass Pipes Are Provided in the Alternative Water Injection Pipe]

FIG. 3 shows a modification example in which the alternative water injection pipe 140 shown in FIG. 1 is provided with bypass pipes 10 and 20 from other alternative water injection pipes 130 and 150.

That is, in the example of FIG. 3, the bypass pipe 10 is connected between the alternative water injection pipe 130 and the alternative water injection pipe 140, and a valve 11 and a check valve 12 are arranged at midpoints in the bypass pipe 10. Further, the bypass pipe 20 is connected between the alternative water injection pipe 150 and the alternative water injection pipe 140, and a check valve 21 and a valve 22 are arranged at midpoints in the bypass pipe 20.

The check valves 12 and 21 prevent water flow from the alternative water injection pipe 140 to the alternative water injection pipes 130 and 150.

Due to the provision of the bypass pipes 10 and 20 as shown in FIG. 3, even if there is some abnormality in the water injection route via the alternative water injection pipe 140, it is possible to perform water injection on the reactor pressure vessel 102 by using the other alternative water injection pipe 130 or 150. Thus, by providing the bypass pipes 10 and 20, it is possible to more reliably secure the water injection route to the reactor pressure vessel 102 at the time of occurrence of a severe accident.

In the example of FIG. 3, there are provided the bypass pipes 10 and 20 to the alternative water injection pipe 140 from the alternative water injection pipe 130 and the alternative water injection pipe 150. Apart from this, it is also possible to provide bypass pipes to the alternative water injection pipe 140 from the other alternative water injection pipes 110 and 120.

[1-5. Example in Which the Pumper Vehicle is Used]

FIG. 4 shows an example in which, when it is impossible to perform water injection using the back-up building 200, the movable pumper vehicle 500 is connected to the alternative water injection pipes 110 through 150 to perform water injection.

As described above, a hose connection portion 243 is arranged in the back-up building 200, and a hose connection portion 253 is arranged outside the back-up building 200. Thus, in the case of the condition where it is impossible to perform water injection using the pumps 211 and 212 in the back-up building 200, it is possible to perform water injection by using the movable pumper vehicle 500 inside the garage 203. For example, the operator moves the movable pumper vehicle 500 to a position in the vicinity of the emergency water source 400. And, the operator connects a suction side hose 501 of the movable pumper vehicle 500 to the emergency water source 400, and connects a discharge side hose 502 to the hose connection portion 253 on the outer side of the back-up building 200, performing the operation of opening a valve 252 of the hose connection portion 253.

The power for operating the movable pumper vehicle 500 is obtained from the power source car 600. Alternatively, the movable pumper vehicle 500 may obtain the power from the power source equipment 202 of the back-up building 200 or some other power source equipment.

In this way, the operator connects the hose 502 of the movable pumper vehicle 500 to the hose connection portion 253 and operates the movable pumper vehicle 500, whereby it is possible to perform water injection into the nuclear reactor building 100 using the alternative water injection pipes 110 through 150 from the emergency water source 400.

Further, as indicated by dashed lines in FIG. 4, the operator may connect a hose 502a of the movable pumper vehicle 500 to the hose connection portion 243 in the back-up building 200 to perform water injection from the emergency water source 400. Alternatively, the operator may connect a hose 502b of the movable pumper vehicle 500 to a hose connection portion 192 arranged outside the nuclear reactor building 100 to perform water injection from the emergency water source 400. In the case of either connection, the operator can perform water injection into the nuclear reactor building 100 using the alternative water injection pipes 110 through 150 from the emergency water source 400.

The operator (operation worker) performing these operations is on standby in the back-up building 200, and moves to the movable pumper vehicle 500 when needed to perform operation. Thus, the operator can perform the operation in the movable pumper vehicle 500, with his safety secured.

In case, at the time of occurrence of a severe accident, it is impossible for the movable pumper vehicle 500 and the power source car 600 to approach the periphery of the nuclear reactor building 100 due to debris or the like, the nuclear power plant may prepare an operation car for removing debris. This operation car may, for example, be stored in the garage 203 of the back-up building 200. By preparing such an operation car, even at the time of occurrence of a severe accident exceeding in scale the accident level to be imagined, it is possible for the operator to quickly install the movable pumper vehicle 500 or the like, making it possible to perform water injection into the nuclear reactor building 100.

<2. Second Embodiment>

Next, the second embodiment of the invention will be described with reference to FIG. 5. In FIG. 5, the portions that are the same as those of the first embodiment described with reference to FIGS. 1 through 4 are indicated by the same reference numerals, and a detailed description thereof will be left out.

FIG. 5 is an overall schematic view of a boiling water type nuclear power plant according to the second embodiment of the invention.

Also the boiling water type nuclear power plant of the present embodiment is provided with the back-up building 200 independent of the nuclear reactor building 100 and exhibiting an anti-hazard property. This back-up building 200 is equipped with the equipment operating panel 201 and the power source equipment 202. Between the back-up building 200 and the nuclear reactor building 100, there are arranged the alternative water injection pipes 110 through 150 performing water injection into the nuclear reactor building 100. And, as in the first embodiment, through the operation of the pumps 211 and 212, the back-up building 200 allows alternative water injection on each portion in the nuclear reactor building 100.

And, as shown in FIG. 5, in the present embodiment, there is provided a garage 700 at a position different from the back-up building 200, and the movable pumper vehicle 500 is disposed in this garage 700.

It is also desirable for the garage 700 to be of a structure exhibiting an anti-hazard property. That is, it is desirable for the garage 700 to be of a structure withstanding earthquake, flood, snow, etc. to secure the soundness of the interior. If possible, it is desirable for the garage 700 to be installed at a place surrounded by hazard walls. In the case of the example of FIG. 5, no garage is provided inside the back-up building 200.

Apart from the movable pumper vehicle 500, the garage 700 may accommodate the power source car 600 shown in FIG. 4 and the operation car for removing debris.

By adopting the construction shown in FIG. 5, it is possible for each of the back-up building 200 and the garage 700 to be of a relatively small building on an appropriate scale, making it possible to improve the anti-hazard property of each building. Further, even if the size of the ground for providing the back-up building 200 is not sufficient, it is possible to install the back-up building 200.

<3. Other Modifications>

In the example of FIG. 2, there is shown the construction of the portion where the alternative water injection pipe 140 is connected to the water injection pipe 180. In this regard, when the other alternative water injection pipes 110, 120, 130, and 150 are to be connected to the other water injection pipes inside the nuclear reactor building 100, it is possible to adopt the same connection construction as that of the example of FIG. 2. That is, also regarding the alternative water injection pipes 110, 120, 130, and 150, it is possible to arrange a flow rate restrictor and water discharge equipment such as a drain at the portions where they are connected to the other pipes.

Further, in the example of FIG. 1, the connection to the alternative water injection pipe 140 is effected by means of the hose connection portion 192 arranged in the vicinity of the nuclear reactor building 100. In this regard, the nuclear reactor building 100 may be provided with a hose connection portion by means of which the connection to the other alternative water injection pipes 110, 120, 130, and 150 is effected.

Further, in the example of FIG. 1, each of the reactor containment vessel 101, the reactor pressure vessel 102, the spent fuel pool 103, the reactor well 104, and the dry well 106 in the nuclear reactor building 100 undergoes alternative water injection through the individual alternative water injection pipes 110 through 150. Instead, it is also possible to arrange solely the alternative water injection pipe 140 and the alternative water injection pipe 148 which perform alternative water injection solely on the reactor pressure vessel 102 in the nuclear reactor building 100, maintaining the soundness of at least the reactor pressure vessel 102.

REFERENCE SIGNS LIST 10, 20 . . . bypass pipe, 11 . . . valve, 12 . . . check valve, 21 . . . check valve, 22 . . . valve, 100 . . . nuclear reactor building, 101 . . . reactor containment vessel, 102 . . . reactor pressure vessel, 103 . . . spent fuel pool, 104 . . . reactor well, 105 . . . pressure suppression pool, 106 . . . dry well, 110 . . . alternative water injection pipe, 111 . . . check valve, 112 . . . gate valve, 120 . . . alternative water injection pipe, 121 . . . check valve, 122 . . . gate valve, 130 . . . alternative water injection pipe, 131, 132 . . . check valve, 133 . . . gate valve, 140 . . . alternative water injection pipe, 141 . . . gate valve, 142, 143 . . . check valve, 144 . . . drain pipe, 145 . . . flow rate restrictor, 146 . . . gate valve, 147 . . . drain, 148 . . . alternative water injection pipe, 150 . . . alternative water injection pipe, 151, 152 . . . check valve, 153 . . . gate valve, 160 . . . spray pipe, 161 . . . pipe, 162 . . . valve, 170 . . . pipe, 171, 172 . . . check valve, 173 . . . gate valve, 180 . . . pipe, 181 . . . valve, 182 . . . check valve, 190 . . . branching-off pipe, 191 . . . valve, 192 . . . hose connection portion, 200 . . . back-up building, 201 . . . equipment operating panel, 202 . . . power source equipment, 203 . . . garage, 211, 212 . . . water injection pump, 213, 221, 222, 223, 224, 225 . . . valve, 231, 232, 333, 234, 235 . . . check valve, 241 . . . branching-off pipe, 242. . .valve, 243 . . . hose connection portion, 251 . . . branching-off pipe, 252 . . .valve, 253 . . . hose connection portion, 300 . . . back-up building water source, 301 . . . pipe, 400 . . . emergency water source, 500 . . . movable pumper vehicle, 501, 502, 502a, 502b . . . hose, 600 . . . power source car

The invention claimed is:

1. A boiling water nuclear power plant comprising:
a nuclear reactor building including a reactor containment vessel and a reactor pressure vessel;
an external building which is installed independently outside the nuclear reactor building, which includes a power source and an operating panel independent of the nuclear reactor building, and which has an anti-hazard property;
a water injection pump installed inside the external building;
a water injection pipe configured to perform water injection on at least the reactor pressure vessel or the reactor containment vessel in the nuclear reactor building from the water injection pump; and
a valve connected to the water injection pipe;
wherein the valve connected to the water injection pipe includes valves arranged inside the nuclear reactor building and valves arranged outside the nuclear reactor building, and the valves arranged inside the nuclear reactor building include a valve operated to be kept constantly open and a check valve which are arranged outside the reactor containment vessel; and
wherein the check valve allows water injection from the outside into the nuclear reactor building and prevents backward flow.

2. The boiling water nuclear power plant according to claim 1, wherein a branching-off pipe is provided at one of the water injection pipes; and a hose connection portion allowing connection of a hose of a pumper vehicle is provided at an end of the branching-off pipe.

3. The boiling water nuclear power plant according to claim 2, wherein the branching-off pipe is provided inside the external building; and the hose connection portion is arranged inside the external building.

4. The boiling water nuclear power plant according to claim 2, wherein the branching-off pipe is provided inside the external building; and the hose connection portion is arranged outside the external building.

5. The boiling water nuclear power plant according to claim 2, wherein the branching-off pipe is provided inside the nuclear reactor building; and the hose connection portion is arranged outside the nuclear reactor building.

6. The boiling water nuclear power plant according to claim 2, wherein the external building includes a garage storing the pumper vehicle.

7. The boiling water nuclear power plant according to claim 1, wherein:
the plurality of water injection pipes includes a first water injection pipe performing water injection on the reactor pressure vessel, and a second water injection pipe performing water injection on other portions of the boiling water nuclear power plant; and
the boiling water nuclear power plant includes a bypass pipe performing water injection on the first water injection pipe from the second water injection pipe, and a valve installed at the bypass pipe.

8. The boiling water nuclear power plant according to claim 2, comprising, at a position different from the external building, a garage storing the pumper vehicle.

9. A boiling water nuclear power plant comprising:
a nuclear reactor building including a reactor containment vessel and a reactor pressure vessel;
an external building which is installed independently outside the nuclear reactor building, which includes a power source and an operating panel independent of the nuclear reactor building, and which has an anti-hazard property;
a water injection pump installed inside the external building;
a water injection pipe configured to perform water injection on at least the reactor pressure vessel or the reactor containment vessel in the nuclear reactor building from the water injection pump; and
a valve connected to the water injection pipe;
wherein the valve connected to the water injection pipe includes valves arranged inside the nuclear reactor building and valves arranged outside the nuclear reactor building, the valves arranged inside the nuclear reactor building including a valve operated to be kept constantly open and a check valve which are arranged outside the reactor containment vessel, and the valves arranged inside the nuclear reactor building are connected to a water injection port inside the nuclear reactor building via an up-grade water injection pipe;
wherein the check valve allows water injection from the outside into the nuclear reactor building and prevents backward flow; and
a water discharge mechanism including a flow rate restrictor is provided at the lowermost point of the up-grade water injection pipe in the nuclear reactor building.

10. The boiling water nuclear power plant according to claim 9, wherein a branching-off pipe is provided at the water injection pipe; and a hose connection portion allowing connection of a hose of a pumper vehicle is provided at an end of the branching-off pipe.

11. The boiling water nuclear power plant according to claim 10, wherein the branching-off pipe is provided inside the external building; and the hose connection portion is arranged inside the external building.

12. The boiling water nuclear power plant according to claim 10, wherein the branching-off pipe is provided inside the external building; and the hose connection portion is arranged outside the external building.

13. The boiling water nuclear power plant according to claim 10, wherein the branching-off pipe is provided inside the nuclear reactor building; and the hose connection portion is arranged outside the nuclear reactor building.

14. The boiling water nuclear power plant according to claim 10, wherein the external building includes a garage storing the pumper vehicle.

15. The boiling water nuclear power plant according to claim 9, wherein:

the water injection pipe includes a first water injection pipe performing water injection on the reactor pressure vessel, and a second water injection pipe performing water injection on other portions of the boiling water nuclear power plant; and the boiling water nuclear power plant includes a bypass pipe performing water injection on the first water injection pipe from the second water injection pipe, and a valve installed at the bypass pipe.

16. The boiling water nuclear power plant according to claim 10, comprising, at a position different from the external building, a garage storing the pumper vehicle.

* * * * *